(12) United States Patent
Bouyoucos

(10) Patent No.: US 6,185,156 B1
(45) Date of Patent: Feb. 6, 2001

(54) UNDERWATER ACOUSTIC IMPULSE SOURCE

(75) Inventor: John V. Bouyoucos, Rochester, NY (US)

(73) Assignee: Hydroacoustics-Inc., Rochester, NY (US)

( * ) Notice: Under 35 U.S.C. 154(b), the term of this patent shall be extended for 0 days.

(21) Appl. No.: 09/329,694

(22) Filed: Jun. 10, 1999

(51) Int. Cl.$^7$ ................................ H04R 1/44; H04K 3/00
(52) U.S. Cl. ................................................ 367/144; 367/1
(58) Field of Search .................... 367/144, 1; 181/118, 181/120; 89/1.13

(56) References Cited

U.S. PATENT DOCUMENTS

| | | | |
|---|---|---|---|
| 4,007,805 | * 2/1977 | Reber | 181/120 |
| 4,300,653 | * 11/1981 | Cao et al. | 367/144 |
| 4,852,071 | 7/1989 | Otto | 367/144 |
| 4,858,205 | 8/1989 | Harrison | 367/144 |
| 5,001,679 | 3/1991 | Harrison | 367/144 |
| 5,572,486 | 11/1996 | Landro et al. | 367/144 |
| 5,592,440 | 1/1997 | Harrison | 367/144 |
| 5,646,910 | 7/1997 | Bouyoucos | 367/144 |
| 5,825,719 | 10/1998 | Harrison, Jr. | 367/144 |
| 5,841,733 | 11/1998 | Bouyoucos et al. | 367/144 |

OTHER PUBLICATIONS

James E. Barger and William R. Hambien, The air gun impulsive underwater transducer, Acoustical Society of America, vol. 68, No. 4, pp. 1038–1045, 1980.

Leolan H. Fry, Jr., A new acoustic transducer for minesweeping based on underwater plasma discharge technology, U.S. Journal of Underwater Acoustics, vol. 47, No. 2, 1997.

* cited by examiner

*Primary Examiner*—Daniel T. Pihulic
(74) *Attorney, Agent, or Firm*—M. LuKacher

(57) ABSTRACT

An acoustic transmission in an underwater environment having a spectrum (amplitude/frequency signature) of interest is generated by cyclically releasing energy which forms impulses which individually have spectral amplitudes principally near one end of the desired spectrum, but which impulses are repeated at a rate near the opposite end of the desired spectrum, which rate may be varied to smooth the spectral response. A multiplicity of impulses may be generated synchronously, the number depending upon the desired amplitude of the spectrum. A multi-port air gun having a stator with a series of ports, which are valved by a rotor coaxial with the stator provides the energy in the form of the release of compressed air bubbles. The rate at which the impulses are produced is controlled by controlling the speed of rotation of the rotor. The amplitude of the transmission may be controlled by means of a ram which moves along the axis of rotation of the rotor to select the number of ports commensurate with the required amplitude of the spectrum. The source may be housed in a tow body and provides a transmission simulating a ship's noise spectrum which may be used as an aid to acoustic mine sweeping.

13 Claims, 4 Drawing Sheets

UNDERWATER ACOUSTIC IMPULSE SOURCE

The present invention relates to acoustic sources for generating acoustic signals or transmissions in an underwater environment, and more particularly to a system which provides a transmission having a spectrum (amplitude/frequency signature) of interest.

The invention is especially suitable for providing an acoustic system and source for emulating the noise spectrum of a ship which is useful for acoustic mine sweeping applications. The U.S. Navy has implemented a program for such applications, called the Advanced Lightweight Influence Sweep System (ALISS). Work under this program is described in an article by L. H. Fry, Jr., U.S. Navy Journal of Underwater Acoustics, vol. 47, no. 2, p. 579 (April 1997).

The invention provides an acoustic source array for use underwater which repetitively releases energy in the form of cavities of compressed air. The repetitive release of such pressurized cavities causes a series of broad frequency band impulses to be produced having a fundamental frequency component at the repetitive release rate. The release rate itself can be modulated in frequency so as to cause the transmission to smoothly cover the desired spectrum. The spectrum generated by such a source array is shown in the solid line in FIG. 1, and is to be compared with the ship-like target spectrum shown in the dashed line curve in FIG. 1. A source, which is adapted to be contained in a tow body, utilizes a generally cylindrical stator having a multiplicity of ports each of which produces an impulse and which are simultaneously opened momentarily by a rotor sleeve at the desired repetition rate. By virtue of the sizing of the ports and the timing of the release of the air the spectrum of interest may be generated. The number of ports may be varied by a ram which is movable through the rotor to control the amplitude of the spectral signature.

While air gun arrays have been used to generate acoustic signals underwater, most air guns are designed to be operated by a sliding valve which moves axially to open or close an exhaust port to release high pressure air into the underwater environment. See, for example, U.S. Pat. No. 5,646,910 issued Jul. 8, 1997 to John V. Bouyoucos and other patents which show typical air gun designs, for example, U.S. Pat. No. 5,572,486, issued Nov. 5, 1996 to M. Candro, et al., U.S. Pat. No. 5,825,719 issued Oct. 20, 1988 to E. R. Harrison, U.S. Pat. No. 4,852,071 issued Jul. 25, 1989 to B. Otto, U.S. Pat. No. 4,858,205 issued Aug. 15, 1989 to E. R. Harrison and U.S. Pat. No. 5,592,440 issued Jan. 7, 1997 and U.S. Pat. No. 5,001,679 issued Mar. 19, 1991, also to E. R. Harrison. Such air guns have been used in arrays of guns of different size to generate an acoustic spectrum preferably flat in shape over a broad frequency range. See, U.S. Pat. No. 5,841,733 issued Nov. 24, 1988 to J. V. Bouyoucos, D. C. Charvoz and D. R. Courtright.

Accordingly, it is the principal object of the present invention to provide an underwater acoustic source and source system for generating transmissions having a spectrum of desired shape and particularly a spectrum emulating that which is produced by a moving surface ship.

It is the further object of the present invention to provide an improved acoustic source and source system for use underwater having a desired dynamic range by controlling the number of synchronous (coherent) releases of energy which produce impulses and which combine to provide the level of the impulsive transmission. This is to simulate the passing of a surface vessel.

It is a still further object of the present invention to provide an improved acoustic source and source system which utilizes a multiplicity of synchronized small air guns, which may be emulated by series of ports through which air is released at desired repetition rates, so as to extend and shape the spectrum produced by the impulses from the ports, the number of ports being controlled from firing to firing (shot to shot) so as to vary the dynamic range of the spectrum.

It is a still further object of the present invention to provide an improved air gun source having a multi-port stator cooperative with a rotor valve for providing controlled and cyclical timed release of pressurized air energy which generates an acoustic spectrum of specified shape.

Briefly described, a source for transmitting acoustic impulses underwater has a body (by which term is meant also a plurality of elements in an array) which is locatable in an underwater environment and charged with energy and which produces a sequence of acoustic impulses released into the underwater environment. An energy controller may be actuated to govern the cyclical timed release of the energy thereby providing an acoustic transmission having a specified spectrum and whose amplitude may be varied with time.

The foregoing and other objects features advantages of the inventions as well as presently preferred embodiments thereof will become more apparent from the reading of the following description in connection with the accompanying drawings in which.

Figure 4:
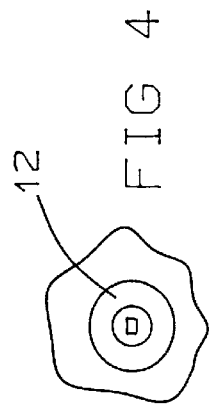
Figure 3:
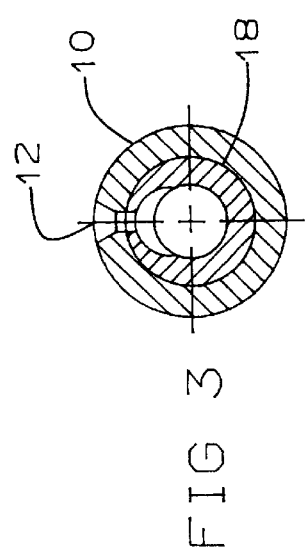
Figure 2:
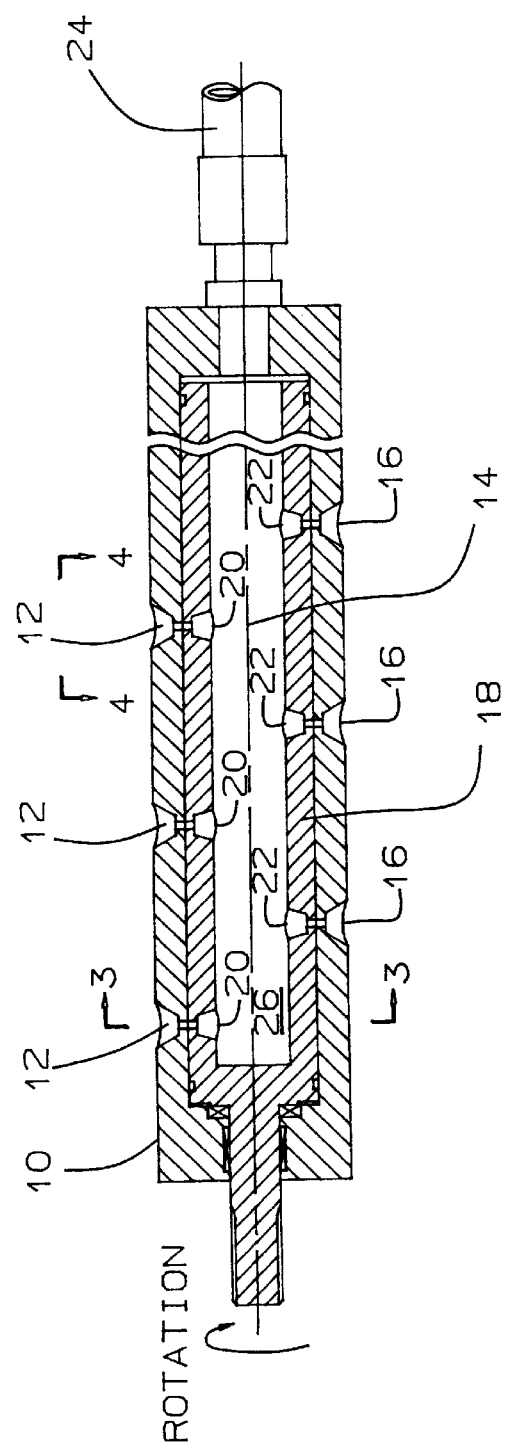
FIG. 2 is a transverse sectional view of an air gun source which provides a multiple port array and is suitable for assembly in a streamlined housing forming a tow body, for example as shown in FIG. 6.
Figure 5:
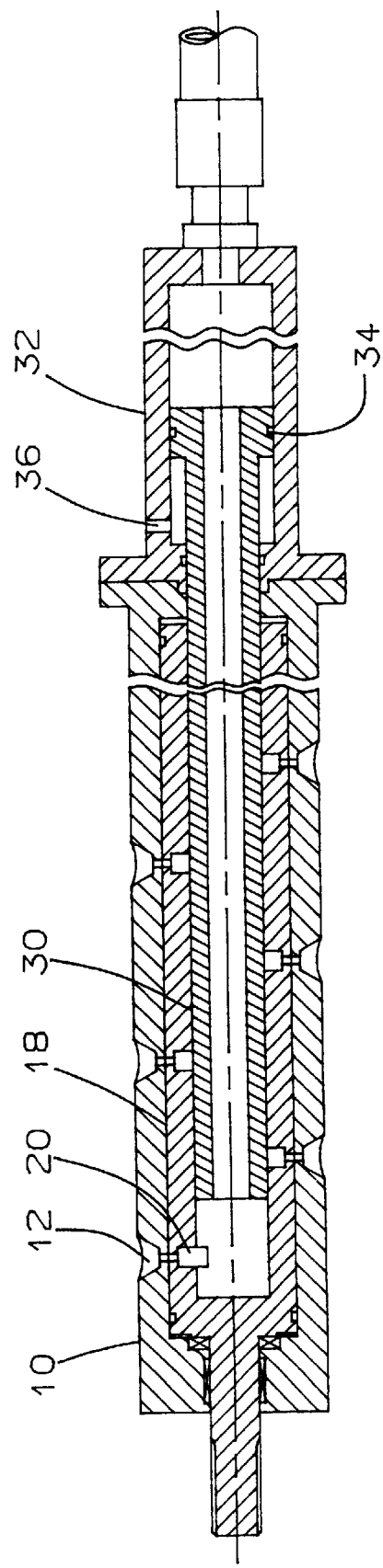
Figure 6:
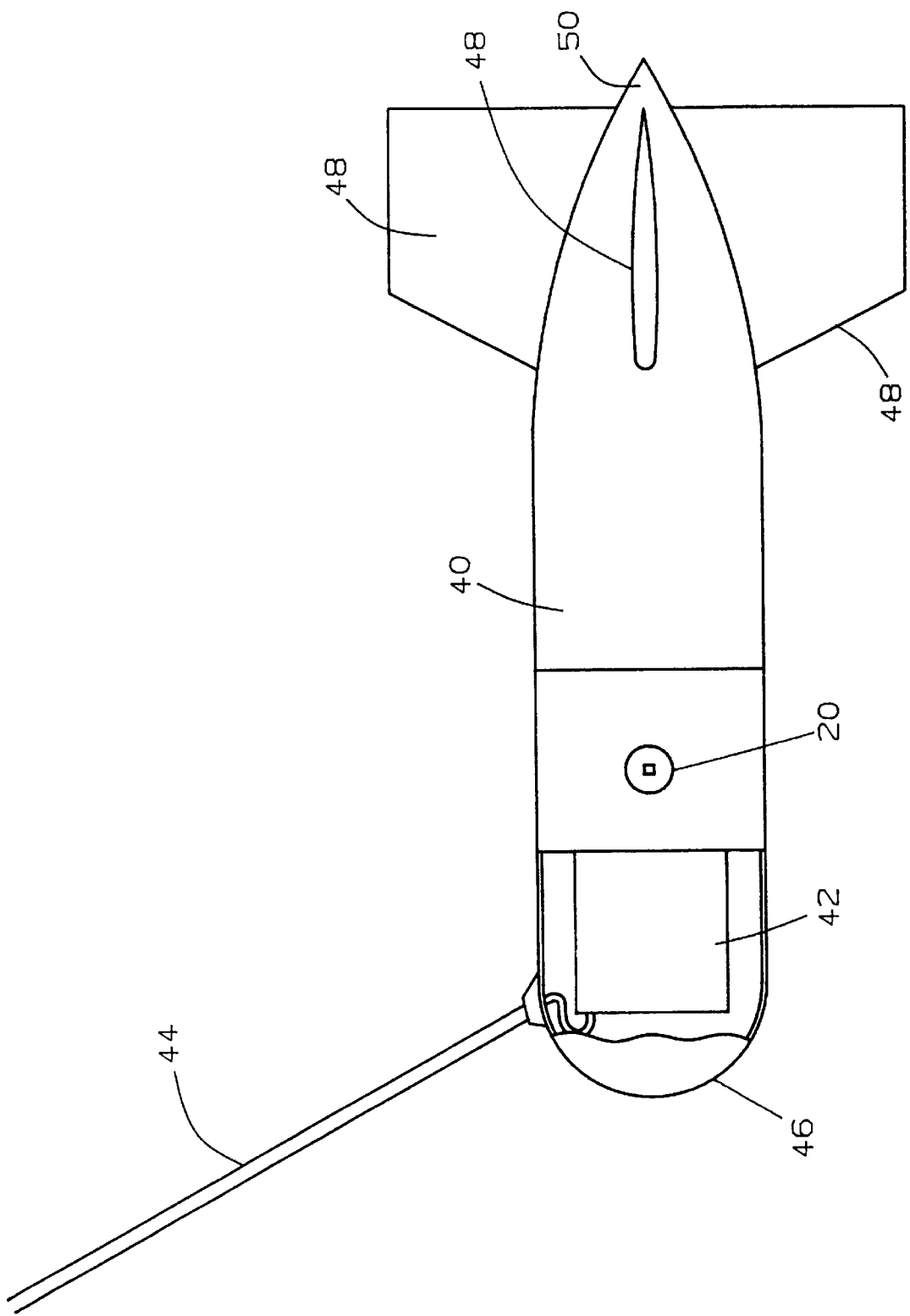

FIGS. 3 and 4 are sectional views taken along the lines 3—3 and 4—4 in FIG. 2;

FIG. 5 is a view of an air gun source similar to the source shown in FIG. 4 having a ram or dynamic range control piston which provides dynamic amplitude range control so as to facilitate the generation of a transmission with the specified spectrum; and FIG. 6 is a schematic view of a tow body incorporating a source such as shown in FIGS. 2 through 5.

Figure 1:
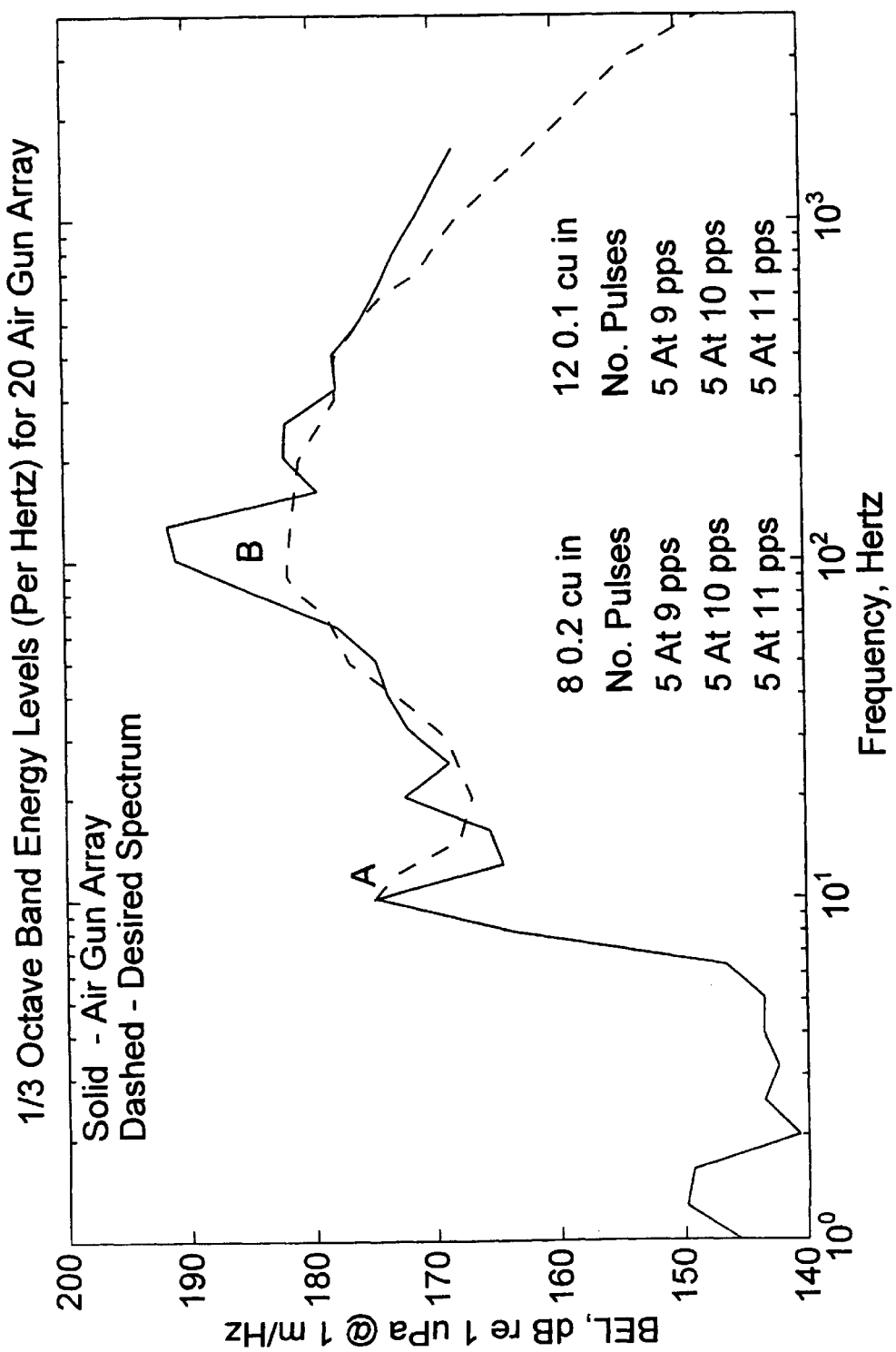
FIG. 1 is a plot of a specified spectrum (in dash lines) and a spectrum which is generated by a source designed in accordance with the present invention (solid line)

Referring to FIG. 1, the curve shown in dash lines is the desired spectrum of a generic surface ship acoustic emission. There is a peak level at around 100 Hz in the upper portion of the spectrum indicated at B. Indicated at A in the lower portion of the spectrum is another peak and the spectrum extends between these peaks. The spectrum may have a dynamic range of about 20 dB and an amplitude modulation at a rate of about 3 dB per second. In accordance with the invention, an array of impulse sources, preferably an air gun array is used. Preferably this array is of small sources, for example, 0.2 cubic inch and 0.1 cubic inch sources as measured by the diameter of their ports and the duration of their open interval. Each port may consider a separate impulse-producing element and several ports may be merged into a single body 10 of cylindrical shape as shown in FIGS. 5 and 6. In the example illustrated in FIG. 1 there are eight 0.2 cubic inch guns or ports and twelve 0.1 cubic inch guns or ports. These ports are momentarily opened (or fired) synchronously at a repetition rate which may be modulated in time. For example, for the case illustrated, there are five firings at a repetition rate of nine pulses per second (pps), a subsequent five at ten pps, and a later five at eleven pps with the sequence continuously repeated. Such repetition gives rise to the spectral peak at around 10 Hz. The ports which are opened or fired at the same time coherently combine to generate an impulse. Because the impulse sequences recur cyclically at a varying repetition rate, the overall spectrum is smoothed and broadened about this nominal repetition rate. The solid line curve representating the air gun spectrum shows a generally smooth variation emulating the specified spectrum depicted by the dashed line. The dynamic range of 20 dB requires a minimum of ten ports or guns, of the cubic inch sizes in this example, to be fired simultaneously. The number of ports or guns is variable over a sequence of shots so as to achieve the smooth control of the spectrum thereby emulating the 3 dB per second amplitude modulation of the specified spectrum. The ports when fired simultaneously emulate a coherent array sized to provide the spectral level of the specified spectrum.

Referring to FIGS. 2 through 5 there is shown a cylindrical body 10 having a multiplicity of ports. The ports 12 are in a first series arranged in a line paralleling the axis 14 of the cylindrical body 10. A second series of ports 16 in staggered relationship to the first series 12 is displaced approximately 180 degrees from the first series about the axis 14. The ports may be of different diameter or size, some providing for the porting of 0.1 cubic inch bubbles of compressed air and others for the porting of the 0.2 cubic inch bubbles. The ports may be tapered outwardly from narrow cylindrical cross-section on the inside of the cylindrical body. A sleeve valve rotor 18 is rotatable about the axis 14 and has two series of ports 20 and 22 in similar opposed relationship to the series of stator ports 12 and 16. The rotor ports also have external narrow sections which come into alignment with the narrow sections of the stator ports once during each cycle of rotation of the rotor. Thus, the opposing ports open and close once. A gas inlet 24 for pressurized air, say at 2,000 psi feeds a chamber or interior bore 26 defined by the rotor 18. Thus, the interior bore is maintained at an average elevated pressure in excess of 100 atmospheres.

Thus, once in each rotation of the rotor 18, the stator and rotor ports are momentarily aligned and a slug of pressurized gas at the interior pressure (e.g., 2,000 psi) will pass via each aligned port to the exterior of the source. If there are ten ports aligned, ten slugs of gas will be emitted simultaneously per one cycle of rotation of the rotor 18. Since the gas can travel at speeds no greater than the speed of sound, the mass of the gas exiting through each port per 360 degree rotation will equal the density of gas at 2,000 psi times the port areas times the product of the speed of sound and the port open time. At a rotation rate of 600 rpm (ten rotations per second), a three inch diameter rotor will have a surface speed of up to 100 inches per second. A 0.1 inch rotary displacement occurs at about one millisecond. To pass 0.2 cubic inches at the speed of sound (say 1,100 feet per second) through a port that is open for one millisecond requires an area of approximately 0.015 inches squared. The width of the port may be selected as 0.1 inch (the distance the rotor travels in one millisecond. The length of the port is then 0.15 inches. Such a port passes a 0.2 cubic inch gas bubble at 2,000 psi at the 1,100 foot per second velocity. The operation simulates a 0.2 cubic inch air gun at 2,000 psi energy. Since the pressure of 2,000 psi is sustained over the one millisecond opening, the operation proximately emulates that of an approximately 0.2 cubic inch air gun and results in an impulse which may undergo a damped bubble oscillation resulting in transient events with a broad spectral peak at approximately 100 Hz (say within 70 to 140 Hz) thereby providing the basis for the desired main peak at approximately 100 Hz. The rotation rate of 600 rpm causes the subsidiary peak at 10 Hz.

In order to control the dynamic range and provide, for example, a 20 dB range, a piston or ram is fitted to slide within the rotor 18. The rotor rotates about the piston or ram 30.

A ram actuator 32 has a piston portion 34 which moves in response to differential pressure between the 2,000 psi input pressure and a control pressure which is controlled and varied by a valve (not shown) connected to an orifice 36. In the illustrated position of FIG. 5 the ram 30 is pushed forward to a position where only one rotor port 12 and stator port 20 is open. The number of stator and rotor ports which are operative and therefore the effective size of the ports and the consequent dynamic range is varied by actuating the ram so as to uncover the number of ports to cover the specified dynamic range. Since the emanation of the gas slugs is coherent (all ports opening and closing at the same time to within say one-tenth millisecond), the contour of the spectrum level goes as 20 LOG N where N is the number of ports open. Thus, with ten ports open, 20 dB of amplitude control can be achieved without changing the shape of the spectrum. The diameter and longitudinal spacing of the ports controls the degree to which there is mutual interaction affecting the individual behavior of the bubble hydrodynamics and the acoustic transmission. Since the source is towed as will be explained in connection with FIG. 6, residual gas from each shot is removed before the next shot, thereby reducing acoustic masking.

As shown in FIG. 6 a towing ship or helicopter with an advance speed of approximately ten knots will clear the bubble field for successive shots at the approximate 10 Hz rate. The body 10 forms the outer shell of a portion of a streamlined housing 40. Only one of the ports 20 is exposed, for purposes of simplifying the illustration. The rotor is driven by a motor 42 which is driven by electrical power passing through the tow cable 44. The motor is within the nose 46 of the tow body. The tow cable also includes a high pressure air hose to feed the air gun ports and a control valve (not shown) to control the position of piston 34. The tow body has fins 48 and is faired at its tail end to facilitate the towing and to control the depth at which the body is towed.

From the foregoing description it will be apparent that there has been provided an improved acoustic source which emulates a specified spectrum. While the use of pressurized air and air gun technology is presently preferred, the advantages of the invention may be obtained from analogous technology such as plasma or sparker technology. Other variations and modifications in the source and source system and in the operation thereof, within the scope of the invention, will undoubtedly suggest themselves to those skilled in the art. Accordingly, the foregoing description should be as illustrative and not in a limiting sense.

What is claimed is:

1. A source for transmitting acoustic impulses underwater comprising a body locatable in an underwater environment and charged with compressed gas, which source produces said acoustic impulses whenever a portion of said compressed gas is abruptly released into said environment, an energy controller actuated to enable cyclical timed release of said gas to provide an acoustic transmission having a predetermined spectrum, and wherein said impulses provide acoustic energy principally in one portion of said spectrum and wherein said cyclical timed release extends said response into portions of said spectrum outside said one portion.

2. A source for transmitting acoustic impulses underwater comprising a body locatable in an underwater environment and charged with compressed gas, which source produces said acoustic impulses whenever a portion of said compressed gas is abruptly released into said environment, an energy controller actuated to enable cyclical timed release of said gas to provide an acoustic transmission having a predetermined spectrum, and further comprising a modulator associated with said controller for changing the timing of said cyclical release to vary the rate of said impulses so as to smooth said spectrum.

3. A source for transmitting acoustic impulses underwater comprising a body locatable in an underwater environment and charged with compressed gas, which source produces said acoustic impulses whenever a portion of said compressed gas is abruptly released into said environment, an energy controller actuated to enable cyclical timed release of said gas to provide an acoustic transmission having a predetermined spectrum, and wherein said body has porting for release of a multiplicity of impulses.

4. The source according to claim 3 further comprising a selector cooperative with said controller for enabling said porting to provide a selected number of said multiplicity of impulses to be released simultaneously per cycle.

5. A source for transmitting acoustic impulses underwater comprising a body locatable in an underwater environment and charged with compressed gas, which source produces said acoustic impulses whenever a portion of said compressed gas is abruptly released into said environment, an energy controller actuated to enable cyclical timed release of said gas to provide an acoustic transmission having a predetermined spectrum, and wherein said body is provided by an array of elements which release said energy coherently to provide each of said impulses, said energy controller being operable to control each of said elements and being cyclically operable to provide said impulses at a predetermined rate selected from a constant rate, a variable rate which increases, a variable rate which decreases and a variable rate which increases to and decreases from said constant rate.

6. The source according to claim 5 wherein said elements are air guns and said gas is air pressurized above the pressure of said underwater environment.

7. The source according to claim 5 wherein said array of elements is provided by a generally cylindrical stator having an array of stator ports communicating with said underwater environment, a rotor provided by a rotatable sleeve valve having a plurality of ports which move cyclically into aligned relationship with said stator ports as said rotor rotates and momentarily, when said rotor and stator ports move into aligned relationship, release said pressurized air through said ports to create each of said impulses at least once during each cycle of rotation of said rotor.

8. The source according to claim 7 wherein said stator and rotor are coaxial, said stator ports being a series of ports spaced from each other along the axis of said stator, said rotor ports being a series of ports having the same spacial relationship as said stator ports.

9. The source according to claim 8 wherein a first and a second series of said rotor and stator ports are provided, the ports in said first series are axially offset with respect to the ports in said second series, whereby to provide first and second groups of said impulses during each cycle of rotation of said rotor.

10. The source according to claim 8 further comprising a piston providing a ram movable axially inside of said rotor sleeve and about which said rotor sleeve is rotatable or selectively changing the number of ports in said series thereby selecting the amplitude of said impulses.

11. The source according to claim 9 further comprising a piston providing a ram movable axially inside of said rotor sleeve and about which said rotor sleeve is rotatable for selectively changing the number of ports in said series thereby selecting the amplitude of said impulses.

12. The source according to claim 10 wherein said ram has a passage for said pressurized air therethrough into a chamber defined by said rotor.

13. The source according to claim 10 further comprising a housing providing a tow body having a streamlined shape, said rotor and stator and ram being disposed in assembled relationship in said housing, a motor connected to said rotor for rotating said rotor, and means for actuating said ram into and out of said rotor to provide amplitude control of said impulses.

* * * * *